United States Patent [19]
Alexion et al.

[11] Patent Number: 4,808,080
[45] Date of Patent: Feb. 28, 1989

[54] FLOW COUPLER ASSEMBLY FOR DOUBLE-POOL-TYPE REACTOR

[75] Inventors: Christopher C. Alexion, N. Huntingdon; Robert M. Slepian, Monroeville Boro; Richard D. Nathenson, Pittsburgh, all of Pa.

[73] Assignee: Electric Power Research Institute, Palo Alto, Calif.

[21] Appl. No.: 888,667

[22] Filed: Jul. 22, 1986

[51] Int. Cl.⁴ ............... H02K 44/02; G21C 15/00
[52] U.S. Cl. .................................. 417/50; 376/404
[58] Field of Search .................... 417/50; 310/11; 376/404

[56] References Cited

U.S. PATENT DOCUMENTS

| | | |
|---|---|---|
| 2,655,107 | 10/1953 | Godbold . |
| 2,715,190 | 8/1955 | Brill . |
| 3,005,313 | 10/1961 | Carlson, Jr. . |
| 3,034,002 | 5/1962 | Carlson, Jr. . |
| 3,115,837 | 12/1963 | Campana . |
| 3,179,824 | 4/1965 | Stuetzer . |
| 3,214,615 | 10/1965 | Way . |
| 3,216,182 | 11/1965 | Cochran et al. . |
| 3,248,578 | 4/1966 | Brill et al. . |
| 3,329,130 | 7/1967 | Cochran et al. . |
| 3,390,571 | 7/1968 | Roach et al. . |
| 3,431,167 | 3/1969 | Hackney et al. . |
| 3,432,694 | 3/1969 | Bidard . |
| 3,462,997 | 8/1969 | Roach et al. . |
| 3,540,286 | 11/1970 | Davidson . |
| 3,567,339 | 3/1971 | Paine . |
| 3,603,062 | 9/1971 | Robbins ........................... 122/34 |
| 3,614,080 | 10/1971 | Foliforev et al. ................ 417/50 |
| 3,788,282 | 1/1974 | Modrak et al. ................. 122/34 |
| 3,992,876 | 11/1976 | Moen et al. .................... 60/39.12 |
| 4,162,150 | 7/1979 | Carson ............................ 55/337 |
| 4,278,404 | 7/1981 | Avanzini ........................ 417/50 |
| 4,294,658 | 10/1981 | Humphreys et al. ........... 417/50 |
| 4,376,715 | 3/1983 | Hummert et al. .............. 252/309 |
| 4,412,785 | 11/1983 | Roman ............................ 417/50 |
| 4,469,471 | 9/1984 | Keeton et al. .................. 417/50 |
| 4,487,739 | 12/1984 | Thatcher et al. . |
| 4,527,955 | 7/1985 | Duncombe et al. . |
| 4,565,667 | 1/1986 | Duncombe et al. . |
| 4,566,859 | 1/1986 | Thissen et al. ................. 417/50 |
| 4,590,347 | 5/1986 | Thatcher et al. . |

FOREIGN PATENT DOCUMENTS

| | | |
|---|---|---|
| 745460 | 2/1956 | United Kingdom . |
| 905940 | 9/1962 | United Kingdom . |
| 2033644 | 9/1982 | United Kingdom . |

OTHER PUBLICATIONS

EPRI "A Proposed Concept For Economical Breeder Planks", by R. K. Winkleblack, Dec. 19, 1980.
EPRI, "High–Efficiency DC Electromagnetic Pumps and Flow Couplers For LMFBRs", by I. R. McNab and C. C. Alexion, Jan., 1981.
"Demonstration of a Flow Coupler for the LMFBR", by R. D. Nathenson, C. C. Alexion, A. R. Keeton, and O. F. Gray, III, Mar. 5, 1984.
"Sodium Electrotechnology at the Risley Nuclear Power Development Laboratories", by Davidson et al., Nucl. Energy, vol. 20, Feb., No. 1, 79–90.

Primary Examiner—Donald E. Stout

[57] ABSTRACT

A liquid metal pump assembly is disclosed as being adapted to be disposed as one of a plurality of like pump assemblies in a continuous, closed array about a core of a nuclear reactor system. Each pump assembly comprises a pipe for receiving and directing a pumped, intermediate liquid metal through the pump assembly, and first and second duct modules disposed on either side of the pipe. Each duct module comprises primary ducts for receiving and directing a primary liquid metal in a first direction, and intermediate ducts in communication with the pipe for directing a first flow of the intermediate liquid metal therethrough in a second direction opposite to the first direction. A mechanism illustratively in the form of a pair of field coils, generates and directs a main magnetic field to each of the primary and intermediate ducts of the first and second duct modules, whereby the interaction of the main magnetic field and the first flow of the intermediate liquid metal generates a first current flow through the intermediate ducts and the primary ducts, and pumps the primary liquid metal through the pump ducts. Further, at least one magnetic element is disposed adjacent one of the first and second duct modules for directing the main magnetic field from the one duct module to an adjacent liquid metal pump assembly, whereby the main magnetic field as generated by each of the plurality of liquid metal pumps is directed in the continuous array.

27 Claims, 6 Drawing Sheets

FLOW COUPLER ASSEMBLY FOR DOUBLE-POOL-TYPE REACTOR

BACKGROUND OF THE INVENTION

1. Field of the Invention:

This invention relates to liquid-metal fast breeder reactors of the double-pool type and, in particular, to an assembly of flow couplers or primary liquid metal pumps particularly adapted for such reactors 2. Reference to Co-pending Applications Reference is made to the following co-pending, commonly assigned patent applications (1) U.S. Ser. No. 822,183, entitled "Electromagnetic Flow Coupler for Regulating Flow Rate/Pressure, " filed Jan. 24, 1986 in the names of C. C. Alexion, A. R. Keeton and R. D. Nathenson; now U.S. Pat. No. 4,688,996;

(2) U.S. Ser. No. 875,150, entitled "A Pump/Intermediate Heat Exchanger Assembly For a Liquid Metal Reactor, " filed June 17, 1986 in the names of R. D. Nathenson, C. C. Alexion and W. C. Sumpman; now allowed;

(3) U.S. Ser. No. 875,151, entitled "Pump/Heat Exchanger Assembly for Pool-Type Reactor " filed June 17, 1986 in the names of R. D. Nathenson and R. M. Slepian; and (4) U.S. Ser. No. 896,028, entitled "A Magnetofluidynamic Generator for a Flow Coupler " filed Aug. 13, 1986 in the name of R. M. Slepian, now U.S. Pat. No. 4,753,576.

3. Description of the Prior Art:

Early in the development of the liquid-metal fast breeder or nuclear reactor (LMFBR), it was recognized that liquid metals could be pumped by electromagnetic (EM) pumps. Such EM pumps offer the advantages of inherent simplicity and the lack of moving parts as compared with conventional, rotating impeller pumps. Such mechanical pumps have inherent problems associated with vibration or thermal distortion in areas of closely toleranced moving parts, such as bearings or seals. Furthermore, cavitation problems associated with a rotating impeller of mechanical pumps do not exist in an EM pump.

One such EM pump, known as a flow coupler, is particularly adapted to pump the primary flow of liquid metal to be heated by the core of a nuclear reactor. Such flow couplers transfer the internal energy of an intermediate flow of liquid metal to the primary flow, driving or pumping the primary flow in Early examples of such flow couplers are described U.S. Pat. No. 2,715,190 of Brill and UK Pat. No. 745,460 of Pulley. In a typical flow coupler, a driven liquid metal in the intermediate flow is directed through a generator duct of the flow coupler. Adjacent to the generator duct is a pump duct, through which flows the primary flow. The intermediate and primary flows of liquid metal within the generator and pump ducts are exposed to a common magnetic field. Passage of the first flow through the common magnetic field generates a relatively low voltage, which produces a large current in the generator duct to be applied to the pump duct by a short, low resistance electrode disposed between the generator and pump ducts and by return conductors disposed on either side of the ducts. Interaction of the resulting high current in the pump duct with the common magnetic field drives the primary flow in the pump duct. In this manner, the intermediate flow of the liquid metal in the generator duct is "coupled " to the primary flow of the liquid metal in the pump duct. The use of such flow couplers in LMFBR systems is described in "Sodium Electrotechnology at the Risley Nuclear Power Development Laboratories", by D. F. Davidson et al., NUCLEAR ENERGY, 1981, Volume 20, February, no. 1, pp. 79–90. U.S. Pat. No. 4,469,471 of A. R. Keeton, et al. describes an improved embodiment of such a flow coupler.

In U.S. Pat. No. 4,412,785 of W. G. Roman, there is described a flow coupler/heat exchanger assembly for use with a nuclear reactor. The assembly forms an annular region between inner and outer shells. A plurality of tube sets is disposed within the annular region, with relatively large spaces between adjacent tube sets. A magnetic field is established in a radial direction through the annular region. A first conductive fluid, e.g. the intermediate liquid metal, is pumped through the spaces between the tube sets by an enlarged intermediate pump. A second conductive fluid, e.g. the primary liquid metal, is introduced into the tube sets. The radial magnetic flux couples the flow of intermediate liquid metal with the flow of primary liquid metal. The externally pumped flow of the intermediate liquid metal in the spaces between the tube sets through the radial magnetic flux, produces a voltage and a current in a circumferential direction about the annular region. The current passes through the adjacent tubes and the primary liquid metal therein, producing a driving force in the opposite direction, whereby the primary liquid metal is driven or pumped.

In a publication entitled, "High-Efficiency DC Electromagnetic Pumps and Flow Couplers For LMFBRs, " EPRI NP-1656, TPS 79-774, Final Report, January 1981, by I. R. McNab and C. C. Alexion, there is described an integral assembly of a heat exchanger and a flow coupler for a pool-type LMFBR. The flow coupler includes a plurality of duct modules disposed in a circle, with a magnetic field coil disposed between adjacent duct modules. Each duct module includes a pump duct through which the primary liquid metal flows and a generator duct through which the intermediate liquid metal flows in an opposite direction. The magnetic flux generated by the magnetic field coil is directed by an iron circuit to form a circular magnetic field through all of the duct modules. In one embodiment, the intermediate liquid metal is introduced into a centrally disposed inlet and directed downwardly to be introduced to an intermediate heat exchanger comprised of a plurality of vertically oriented tubes. The intermediate liquid metal is then directed upward and about these tubes, before being introduced into each of the generator ducts. The primary flow of liquid metal is directed downwardly through the pump ducts, exiting the pump ducts and being introduced into the tubes of the intermediate heat exchanger, flowing downwardly therethrough, before being discharged and recirculated to the nuclear core. It is contemplated that the flow coupler may be located beneath such an intermediate heat exchanger.

The above-identified application entitled, "A Pump-/Intermediate Heat Exchanger Assembly For A Liquid Metal Reactor, " describes a plurality of flow coupler/heat exchanger assemblies disposed in a circular array within a nuclear reactor. In such an assembly, the flow coupler is disposed beneath the intermediate heat exchanger and in a co-linear relationship therewith. The primary liquid metal is directed from the reactor core and is introduced into the intermediate heat exchanger flowing down through an array of tubes enclosed in an annular cavity of the intermediate heat exchanger. The intermediate liquid metal is fed into the assembly via a centrally disposed "downcomer" pipe through the intermediate heat exchanger to the flow coupler and, in particular, to a first plenum for distributing the intermediate liquid metal to a plurality of flow couplers or duct modules, each comprised of one or more sets of pump and generator ducts. The intermediate liquid metal exits the first plenum being directed up in parallel through the generator ducts of the flow coupler modules. The intermediate liquid metal exiting the pump ducts is collected in a second plenum before being introduced into the annular cavity to be heated by the primary liquid metal flowing downwardly through the tubes. After being heated, the intermediate liquid metal is discharged and directed to a steam generator. The cooled, primary liquid metal is discharged from the tubes into a third plenum, before it is directed downwardly in parallel through the plurality of pump ducts, whereby the cooled, primary liquid metal is directed at relatively high pressure, i.e. pumped, into an annular plenum at the bottom of the nuclear reactor for return to the reactor core.

In the above referenced patent application entitled, "A Magnetofluidynamic Generator for a Flow Coupler", there is described a primary liquid metal pump comprised of a plurality of flow couplers disposed in a circular array, each flow coupler including at least one primary duct and one intermediate duct for receiving respectively flows of an intermediate liquid metal and a primary liquid metal. A field coil is disposed between each set of ducts and is energized by an auxiliary coil excitation generator, including a bootstrap liquid metal generator duct and means for generating an auxiliary magnetic field though the bootstrap generator duct. A portion of the flow of the intermediate liquid metal is directed through the bootstrap generator ducts to interact with the auxiliary magnetic field, whereby a flow of current is generated across the bootstrap generator duct and applied to excite the field coils.

In a double-pool type reactor, as will be explained in detail below, the primary liquid metal is placed in a primary vessel also containing the reactor core, the primary liquid metal pumps, and the intermediate heat exchangers. The intermediate liquid metal is placed in a secondary vessel, which surrounds the primary vessel and contains the secondary pumps and steam generators. In the prior art double-pool-type reactors, the mechanical-type primary liquid metal pumps and the intermediate heat exchangers are disposed in an annulus surrounding the reactor core. In order to substitute a flow coupler for the prior art mechanical primary liquid metal pumps, it is necessary to reconfigure the shape of such flow couplers, as well as to reconfigure the magnetic field and conduits for conveying the primary and intermediate liquid metals.

SUMMARY OF THE INVENTION

It is an object of this invention to provide a new and improved liquid metal pump assembly as particularly adapted to be incorporated into a double-pool-type nuclear reactor.

It is a still further object of this invention to provide a new and improved liquid metal pump adapted to be disposed in an array of like pumps in a continuous, closed configuration about the reactor core of a nuclear reactor system.

It is a still further object of this invention to provide a new and improved pump assembly of symmetrical configuration for generating a magnetic field adapted to be coupled with magnetic fields of like pumps disposed in a circular array about a reactor core of a nuclear reactor system.

In accordance with these and other objects of the invention, there is provided a liquid metal pump assembly adapted to be disposed as one of a plurality of like pump assemblies in a continuous, closed array about a core of a nuclear reactor system. Each pump assembly comprises a pipe for receiving and directing a pumped, intermediate liquid metal through the pump assembly, and first and second duct modules disposed on either side of the pipe. Each duct module comprises a primary duct for receiving and directing a primary liquid metal in a first direction, and an intermediate duct in fluid communication with the pipe for directing a first flow of the intermediate liquid metal therethrough in a second direction opposite to the first direction. A mechanism illustratively in the form of a pair of field coils and associated iron poly pieces generates and directs a main magnetic field to each of the primary and intermediate ducts of the first and second duct modules, whereby the interaction of the main magnetic field and the first flow of the intermediate liquid metal generates a first current flow through the intermediate ducts and the primary ducts, and pumps the primary liquid metal through the pump ducts. Further, at least one magnetic element is disposed adjacent one of the first and second duct modules for directing the main magnetic field from the one duct module to an adjacent liquid metal pump assembly, whereby the main magnetic field as generated by each of the plurality of liquid metal pumps is directed in the continuous array.

In a further feature of this invention, the exciting current for the first and second field coils is provided by a bootstrap generator comprised of an auxiliary generator duct for receiving a second flow of the intermediate liquid metal, and an auxiliary mechanism for generating an auxiliary magnetic field through the auxiliary generator duct, whereby the interaction of the auxiliary magnetic field and the second flow of the intermediate liquid metal generates a second current flow applied to actuate the first and second field coils.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
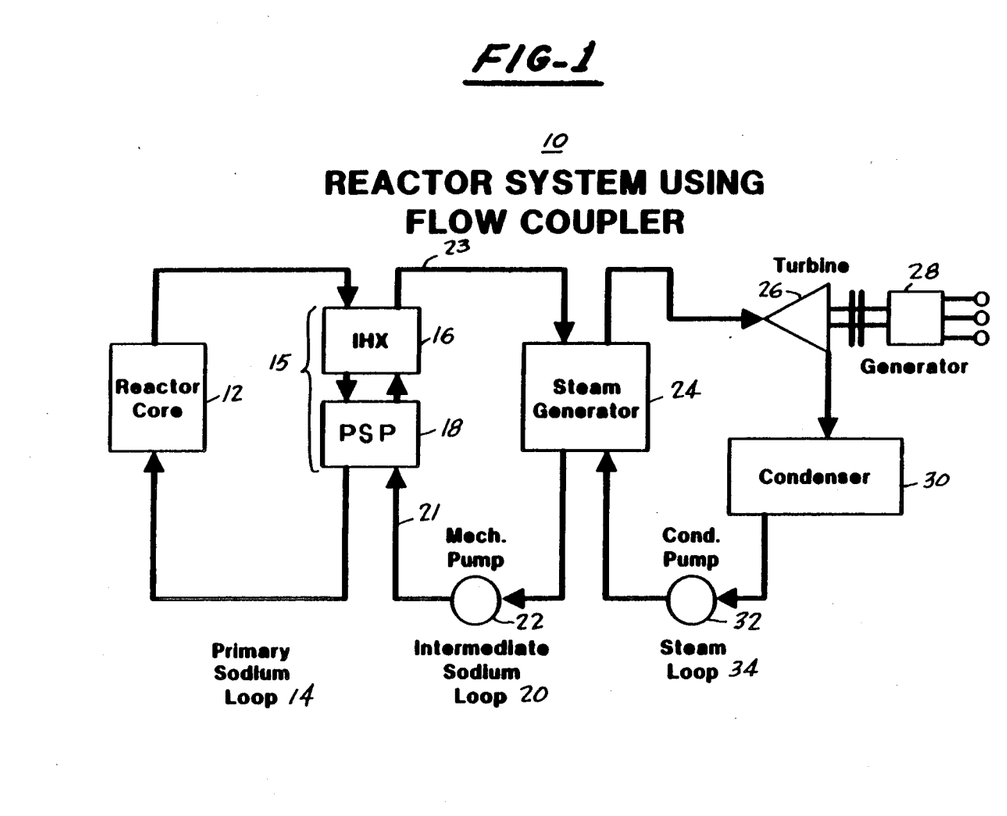
FIG. 1 is a simplified schematic of a nuclear liquid metal reactor system incorporating an assembly of a primary sodium pump (PSP) and heat exchanger (IHX) in accordance with the teachings of this invention.

Referring now to the drawings and in particular to FIG. 1, there is shown a reactor system 10 including an assembly 15 of an intermediate heat exchanger (IHX) 16 and a flow coupler or primary sodium pump (PSP) 18. The IHX 16 and the PSP 18 are coupled in circuit with a primary loop or flow 14 of an electrically conductive fluid, such as sodium, and an intermediate loop or flow 20 of an electrically conductive fluid, e.g. sodium. As will be explained, the PSP 18 pumps the liquid metal about the primary loop 14 to and from a reactor core 12, where the primary fluid is heated to relatively high temperatures on the order of 500° C.

The IHX 16 transfers thermal energy from the heated primary liquid metal to the intermediate liquid metal. In the intermediate loop 20, a mechanical pump 22 pumps the intermediate liquid metal through an inlet conduit 21 to the PSP 18 in the form of a flow coupler, which as will be explained in detail below, transfers internal energy from the driven intermediate liquid metal to the primary liquid metal; it is contemplated that the mechanical pump 22 must be of increased capacity to also drive the primary liquid metal. The intermediate liquid metal passes through the IHX 16 receiving thermal energy from the primary liquid metal as heated by the core 12 and passes via outlet conduit 23 to a steam generator 24.

A vaporizable fluid, such as water, is circulated through the steam generator 24, whereby the water is vaporized, before being circulated about a steam loop 34 to a turbine 26, whereby the impellers of the turbine 26 are rotated to drive an electric generator 28, which in turn outputs electrical energy. The spent vapor leaves the turbine 26 and is condensed by a condenser 30, before returning to the condensate pump 32, to be recirculated through the steam generator 24.

Figure 2A:
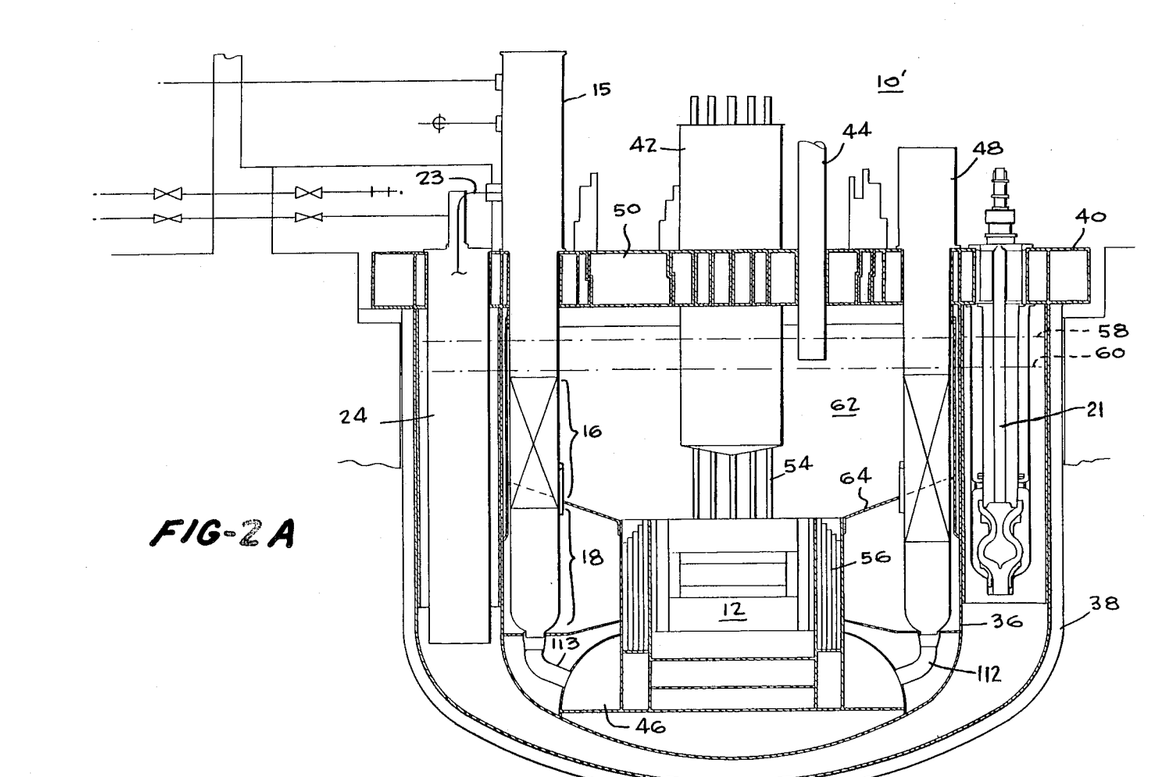
FIGS. 2A and 2B are respectively a simplified, side sectioned view and a broken away top, plan view of a double-pool-type reactor, as generally shown in FIG. 1.
Figure 2B:
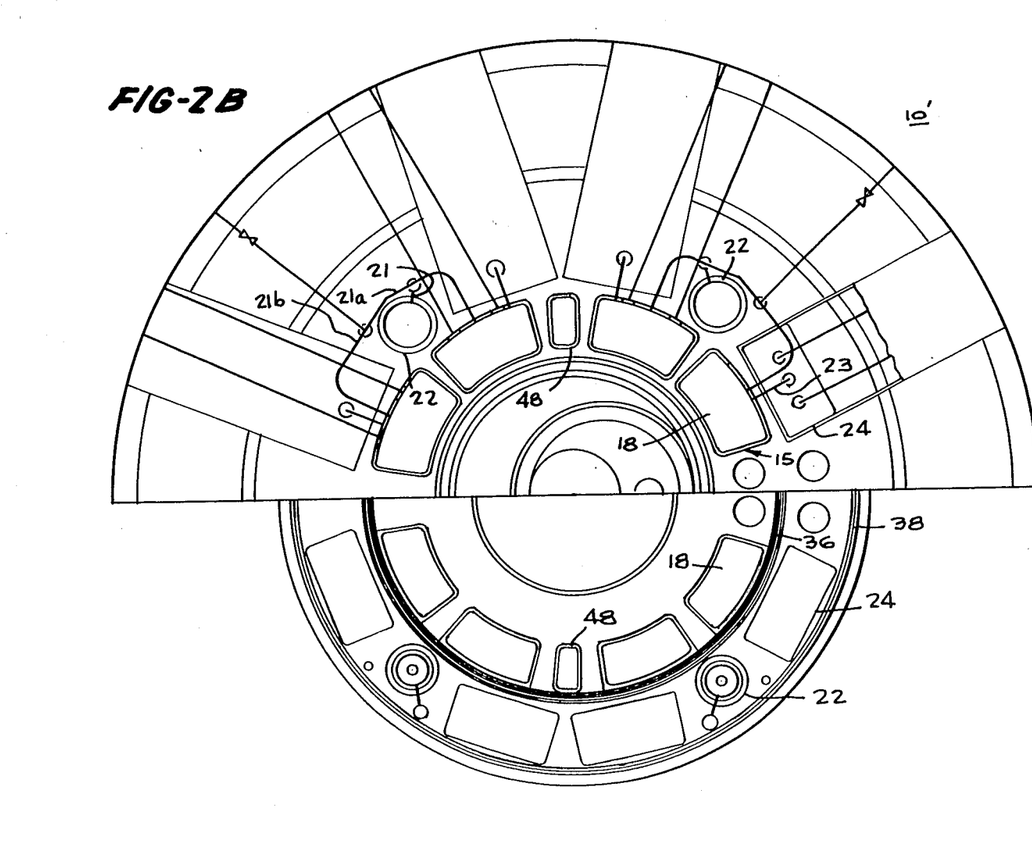

A modified double-pool-type reactor 10' is shown in FIGS. 2A and 2B. The reactor 10' includes a primary vessel 36 receiving the reactor core 12, a plurality of the PSP/IHX assembly's 15, illustratively four to eight such assemblies, and a plurality of direct reactor auxiliary cooling systems (DRACS) 48, illustratively two such systems, the assemblies 15 and DRACS 48 being disposed in a circular array about the centrally disposed reactor core 12. The primary liquid metal, e.g. sodium, is also contained within the primary vessel 36. The secondary or intermediate liquid metal, e.g. sodium, is placed in a secondary vessel 38, which surrounds the primary vessel 36 and contains the secondary mechanical pumps 22 and the steam generators 24. The primary liquid metal is discharged from the PSPs 18 and directed through outlet conduits 113 into a pressurized, annularly-shaped core plenum 46. In a similar fashion, each of the DRACS 48 discharges its primary liquid metal through an outlet conduit 112 into the plenum 46. A separator 64 associated with the reactor core 12 defines a hot plenum 62 for storing the primary liquid metal. After being heated within the reactor core 12, the primary liquid metal is introduced into the hot plenum 62.

The reactor 10' is covered by a roof slab or reactor deck 40, on which there is supported an upper internal structure 42 and a fuel handling machine 44. As is well known in the art, the roof slab 40 includes a multiple rotating plug for access to the core fuel and transfer of the fuel. A plurality of control rods 54 are moveable into and from the reactor core 12. A neutron shield 56 surrounds the reactor core 12. As indicated in FIG. 2A, the primary liquid metal fills the primary vessel 36 to a normal level 58. The primary liquid metal should not fall below a minimum sodium level 60.

In operation, the primary liquid metal circulates through the reactor 10' in substantially the same fashion as in a conventional pool-type reactor. The heated primary liquid metal flows from the hot plenum 62 and is introduced into the IHX 16, where it serves to heat the intermediate liquid metal, before being directed into the PSP 18. The PSP 18 pumps it therefrom through the outlet conduit 113 and the pressurized plenum 46 to be returned to the reactor core 12.

The relatively cool intermediate liquid metal as contained within the bottom most portion of the secondary vessel 38 is withdrawn and pumped upward by the secondary mechanical pump 22 through a vertically disposed conduit 21, which penetrates the roof slab 40 to supply the intermediate liquid metal through a T-junction and a pair of inlet conduits 21a and 21b to be introduced into a corresponding pair of the IHX/PSP assemblies 15 and, in particular, to their IHXs 16. The intermediate liquid metal is pumped by the mechanical pump 22 upward through the IHX 16, whereby it is heated by the primary liquid metal. The heated intermediate liquid metal is directed upward through the roof slab 40, before being discharged from the IHX/PSP assembly 15 via the output conduit 23 into a corresponding one of the steam generators 24. The heated intermediate liquid metal enters each steam generator 24 at its top to be released at its discharge headers, before flowing downward into the bottom of the secondary vessel 38.

Figure 3:
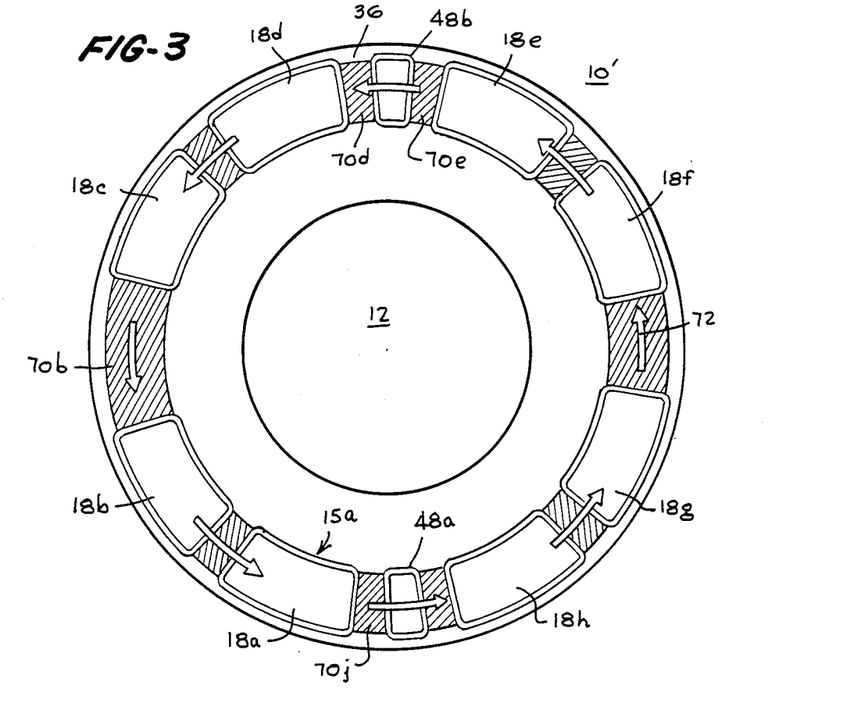
FIG. 3 is a simplified, sectioned view, taken from above of the double-pool-type reactor, as shown in FIGS. 1, 2A and 2B particularly illustrating the arrangement of the flow couplers or primary liquid metal pumps for generating an annular main magnetic field.

A plurality of the PSP/IHX assemblies 15 are disposed in a circular array within the primary vessel 36, as shown in FIG. 3. In contrast to the PSP/IHX assemblies of the prior art, the PSP/IHX assemblies 15 have been elongated and configured to fit within an annularly-shaped space corresponding to the circular array. Illustratively, there is shown eight PSPs 18a to 18h. As will be explained, each of the PSPs 18 includes a field coil for generating a main magnetic field of toroidal configuration as identified by arrows 72. A plurality of pole pieces 70a to 70j of varying sizes is disposed between adjacent PSPs 18 to form the fields as generated by each of the PSPs 18 into the continuous main magnetic field 72. In addition, a pair of the DRACS 48a and 48b is disposed respectively between PSPs 18h and 18a, and between PSPs 18d and 18e.

Figure 4A:
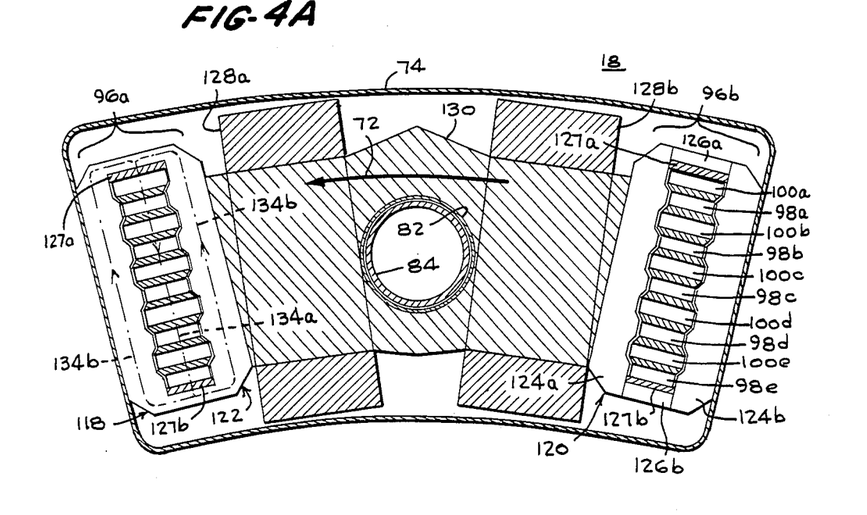
FIGS. 4A and 4B are respectively a plan, sectioned view taken from above the flow coupler as generally shown in FIG. 3, and a side, sectioned view of the flow coupler as shown in FIG. 4A as taken along line 4B-4B.
Figure 4B:
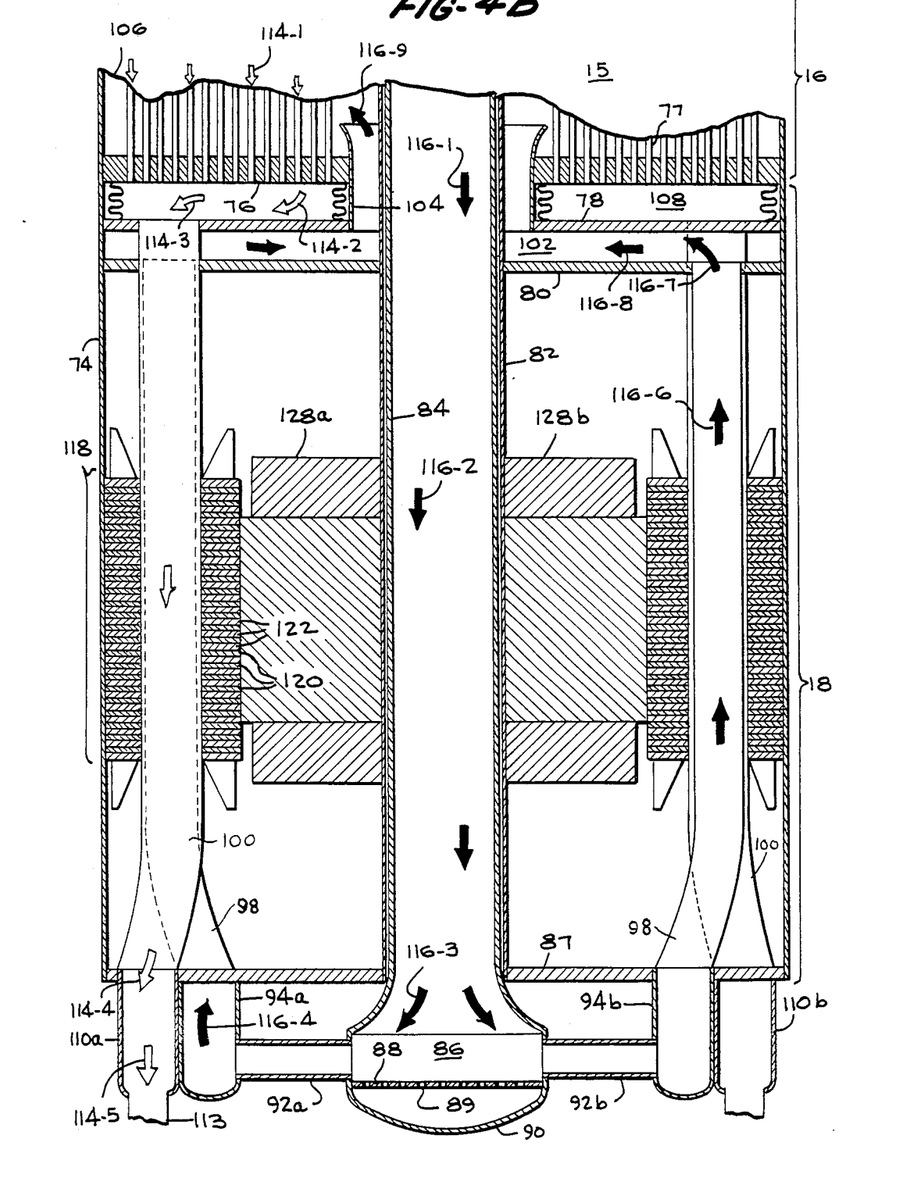

Additional details of a first embodiment of the PSP/IHX assembly 15 are shown in FIGS. 2A and 4A and 4B. As shown particularly in FIG. 4B, the input conduit 21 is coupled to a downcomer pipe 84 which extends centrally along substantially the entire length of the assembly 15 for introducing the intermediate liquid metal into a lower downcomer plenum 86, disposed at the bottom of the assembly 15. The intermediate liquid metal is directed via a pair of interconnecting conduits 92a and 92b to respective ones of a pair of lower, intermediate duct plenums 94a and 94b. The plenum 86 includes an elliptically shaped dome 90 and a hydrostatically balanced momentum plate 88, having a number of openings therein, for containing the downward force and pressure of the intermediate liquid metal and for diverting it via the pair of conduits 92a and 9b. The dome 90 contains the pressure of the intermediate liquid metal which before passing through the PSP 18 is high relative to the pressure of the primary liquid metal. The dome 90 distributes the pressure of the intermediate liquid metal over its surface as a "membrane stress".

Each of the lower, intermediate duct plenums 94a and 94b is in communication with a plurality of intermediate or generator ducts 98, whereby the intermediate liquid metal passes upward and out of the page of FIG. 4A through the ducts 98 and into an upper intermediate plenum 102 as shown in FIG. 4B. The plenum 102 is in communication with an intermediate heat exchange (IHX) cavity 106, wherein a plurality of tubes 77 is supported. The intermediate liquid metal passes about the tubes 77 thereby being heated by the primary liquid metal passing downward through the tubes 77, before the intermediate liquid metal is discharged from the PSP/IHX assembly 15 via the outlet conduit 23 to the steam generator 24. The lower downcomer plenum 86, the lower intermediate duct plenums 94 and the upper intermediate plenum 102 must be capable of withstanding a 150 lb$_f$/in$^2$ overpressure of the intermediate liquid metal and, therefore, are constructed as all-welded structures having walls of a thickness greater than the corresponding primary plenum walls.

Referring particularly to FIG. 4B, the primary liquid metal is introduced into the PSP/IHX assembly 15 via the inlet conduit 21 and is directed down through the tubes 77 into an upper primary plenum 108, which is disposed in communication with a plurality of the primary or pump ducts 100. The primary ducts 100 direct the primary liquid downward as shown in FIG. 4B discharging the primary liquid metal into corresponding ones of a pair of lower primary plenums 110a and 110b. Thereafter, the primary liquid metal is directed via the outlet conduit 113 to the pressurized plenum 46.

The PSP/IHX assembly 15 includes an outer shell 74, which encloses and houses each of the IHX 16 and the PSP 18. The outer shell 74 is connected at its upper end to an upper support plate (not shown) and to a lower tube sheet 76, between which are supported the plurality of tubes 77. An annularly shaped, outer upper support plate 78 is supported in part by the outer shell 74 to form with the lower tube sheet 76 the upper primary plenum 108 for receiving the intermediate liquid metal. Further, the outer shell 74 and a centrally disposed inner shell 82 support therebetween an inner, upper support plate 80. The plate 80 is disposed below the outer, upper support plate 78 to form therewith the upper intermediate plenum 102, which is in communication with the intermediate ducts 98 for receiving the intermediate liquid metal therefrom. The outer shell 74 and the inner shell 82 support at its lower ends a lower support plate 87, which in turn supports the lower ends of the intermediate ducts 98 and the primary ducts 100.

Referring now to FIG. 4A, the PSP 18 illustratively comprises a plurality of individual pumps or flow couplers in the form of duct modules 96a and 96b. Each duct module comprises a first plurality of the intermediate or generator ducts 98a, 98b, 98c, 98d and 98e, and a second plurality of primary or pump ducts 100a, 100b, 100c, 100d and 100e. Illustratively, the intermediate ducts 98 and primary ducts 100 form a sequence beginning at the top of the outer shell 74 as seen in FIG. 4A, of the primary duct 100a followed by the intermediate duct 98a, the primary duct 100b, the intermediate duct 98b, the primary duct 100c, the intermediate duct 98c, the primary duct 100d, the intermediate duct 98d, the primary duct 100e and the intermediate duct 98e.

Referring particularly to FIG. 4A, the main magnetic field 72 is generated in part by a pair of field coils 128a and 128b. The downcomer pipe 84, as surrounded by the inner shell 82, is disposed centrally within the outer shell 74. A pole piece 130 forms the main magnetic field 72 as generated by the coils 128 into a path or circuit that flows through each of the primary ducts 100 and intermediate ducts 98 of the duct modules 96a and 96b.

As shown in FIG. 3, the incorporation of the pole pieces 70 between the eight IHX/PSP assemblies 15 and in particular between the PSPs 18 provides one continuous main circuit about the reactor core 12, thus linking all eight PSPs 18. The main magnetic field 72 as generated within each PSP 18 forms a part of the main magnetic field as it is directed about the continuous circuit formed of the PSPs 18 and the pole pieces 70. This arrangement of PSPs 18 and the pole pieces 70 eliminates the need for any return iron in the PSPs 18. Further, the pole pieces 70 as disposed between adjacent PSPs 18 minimize the leakage flux from the main magnetic field 72 and reduce the magnetomotive force required to drive the main circuit. The use of plural field coils 128 is for redundancy and reduces the size of each field coil 128 to permit them to be arranged compactly within a relatively small space. Each field coil 128 is separately powered by its own set of coil leads (not shown) to allow complete control in monitoring of each field coil 128. Illustratively, the field coils 128 take the form of externally excited DC electromagnets. Depending upon the winding scheme of such electromagnets, the power source may be a conventional medium-voltage (220 to 240 volt), low current supply or a low-voltage, high current supply, such as a homopolar generator. An electromagnetic coil with many turns requires lower current, but is more difficult to cool because of the insulation between turns. In an illustrative embodiment of this invention, the field coils 128 are made of a single solid turn, comprised of a highly conductive material such as copper. Such a single turn coil, though requiring greater current, is operated at lower temperatures than multiple turn coils.

In an alternative, embodiment of this invention, the field coils 128 maybe replaced with permanent magnets. Permanent magnets as made of an Al-Ni-Co alloy exhibit high residual magnetism to produce a relatively high magnetic flux density in short air-gaps. Alternatively, magnets could be made of such a magnetic material as Indox, which provides the magnet with high coercive force qualities and produces lower flux density, but maintains its level over a broad range of air-gap links. Such magnets would operate in the high range of temperatures expected within the reactor system 10'.

As shown in FIG. 4A, the layout of each PSP 18 is essentially symmetrical with a single downcomer pipe 84 being disposed in the center thereof. The duct modules 96a and 96b are disposed symmetrically on either side of the downcomer pipe 84. As will be explained, current is generated to flow inward through the intermediate ducts 98 and the primary ducts 100 of each of the duct modules 96. To achieve the symmetrical arrangement of the PSP 18, there must be an even number of the field coils 128 and their corresponding air-gaps, e.g. either two or four coils 128. The optimum number of duct modules 96, the active length and total length of the flow coupler and the cross sectional aspects ratio and liquid velocity are set to achieve a maximum overall efficiency. In an illustrative embodiment of this invention, each duct module 196 was preferably selected to have five pairs of the intermediate ducts 98 and the primary ducts 100, thus providing a total of 10 ducts 98 and 100 for each PSP 18. Each of the ducts 98 and 100 is dimensioned to carry one-tenth of the total flow, or 3,000 gal/min primary flow and 2,500 gal/min intermediate flow.

Each of the duct modules 96 acts in parallel with the others to transfer at high efficiency the internal energy in the form of a relatively high hydraulic head or pressure of the intermediate sodium as established by the mechanical pump 22 to the primary liquid metal by action of the coupled electric currents and main magnetic field 75. Such coupling is based on the Lorentz relation where the force $\vec{F}$ on a charge $q_o$ moving through a magnetic field $\vec{B}$ with velocity $\vec{V}$ is expressed by the relation:

$$\vec{F} = q_o \vec{V} \times \vec{B}.$$

As this is a vector relationship, the force $\vec{F}$ is maximized when velocity $\vec{V}$ is perpendicular to the magnetic field $\vec{B}$. The field coils 128 create a toroidally-shaped magnetic field as indicated by the arrows 72, which passes through each of the ducts 98 and 100 of each duct module 96. As the main magnetic field 72 passes through each of the primary ducts 100, the interaction of the intermediate liquid metal pumped upwardly along a line perpendicular to and out of the face of FIG. 4A, and the magnetic field 72 directed at right angles to that line, ultimately causes a main current flow directed radially inward along path 134a toward the center of the reactor system 10', as indicated by the dotted line 134a.

As illustrated in FIGS. 4A and 4B, each duct module 96 is formed within a laminate structure 118. The laminate structure 118 is comprised of a plurality of interleaved, rectangularly shaped plates 120 and 122. The composite plates 120, as shown on the right side of FIG. 4A, includes a pair of side elements 124a and 124b disposed along the sides of the duct module 96 and made of a magnetic material to facilitate in conjunction with the pole piece 130, the flow of the magnetic field 72 through the air gaps formed by the duct modules 96. The composite plate 120 further includes top and bottom elements 126a and 126b made of a material of high strength, such as a non-magnetic stainless steel, to resist internal pressures within the ducts 98 and 100, without "short-circuiting" the magnetic field about the duct modules 96. These elements 126 are adjacent to but insulated from the top and bottom electrodes 127a and 127b, which are constructed of a single highly electrically conductive material, such as copper, that extends axially the entire active length 118 of the flow coupler. The return conductors in the form of plates 122, as shown on the left side of FIG. 4B, may in one illustrative embodiment of this invention be an integrally formed, rectangularly shaped member; the plates 122 are made of a highly electrically conductive material such as copper and are disposed about the top and bottom electrodes 127a and 127b to make good electrical contact therewith.

As shown in FIG. 4A, a pair of effective return paths 134b is formed within the side elements of the return plate 122 about the ducts 98 and 100 before being reintroduced into the primary duct 100a. The current flow within each duct module 96 and its laminate structure 118 is electrically isolated from each other. The interaction between the main current flow directed radially inward along the path 134a through the pump ducts 100a, 100b, 100c, 100d and 100e, and the magnetic field 72 directed perpendicular to such current flow 134a, imposes a force on the primary liquid metal within the primary ducts 100a, 100b, 100c, 100d and 100e pumping the primary liquid metal downwardly along a line perpendicular to and into the page of FIGS. 4A.

Referring now to FIGS. 4A and 4B, a brief summary of the hydraulic flows of the intermediate and primary liquid metals will be given. The arrows 116-1 to 116-9 indicate the flow of the intermediate liquid metal through the PSP/IHX assembly 15, starting with arrow 116-1 indicating where the flow of the intermediate liquid metal begins and arrow 116-9 indicating where the intermediate liquid metal exits from the PSP 18 and eventually from the PSP/IHX assembly 15. The intermediate liquid metal is received from the inlet conduit 21 of the intermediate loop 20 and is directed downward through the downcomer pipe 84 and into the lower, interior or downcomer plenum 86. The flow of the intermediate liquid metal is redirected through the interconnecting conduits 92a and 92b to the pair of lower intermediate duct plenums 94a and 94b, respectively, before being directed upward through each of the intermediate ducts 98a, 98b, 98c, 98d and 98e of each of the duct modules 96. The parallel flows of the intermediate liquid metal through the ten intermediate ducts 98, is introduced into the upper, intermediate plenum 102, which collects and directs with a minimum loss of pressure the intermediate liquid metal upward through the annulus formed by the annular connecting conduit 104 and the downcomer pipe 82, and into the IHX 16. The intermediate liquid metal flows upwardly through the IHX 16 circulating about and through the spaces between the tubes 77, before being discharged, to be returned by the outlet conduit 23 to the intermediate loop 20.

In a similar fashion, the primary liquid metal is directed through the PSP/IHX assembly 15 along the path and in the sequence as indicated by the arrows 114-1 to 114-5. The heated primary liquid metal is returned from the reactor core 12 and is introduced into the tubes 77 of the IHX 16, giving up its thermal energy to the intermediate liquid metal flowing thereabout. The cooled primary liquid metal exits the tubes 77 flowing into the upper primary plenum 108. The primary liquid is directed through the openings within the support plate 78 and each of the plurality of sets of the primary ducts 100a, 100b, 100c, 100d and 100e, to be pumped, before being discharged through the lower primary plenums 110 and the conduits 113 into the core plenum 46.

Figure 5:
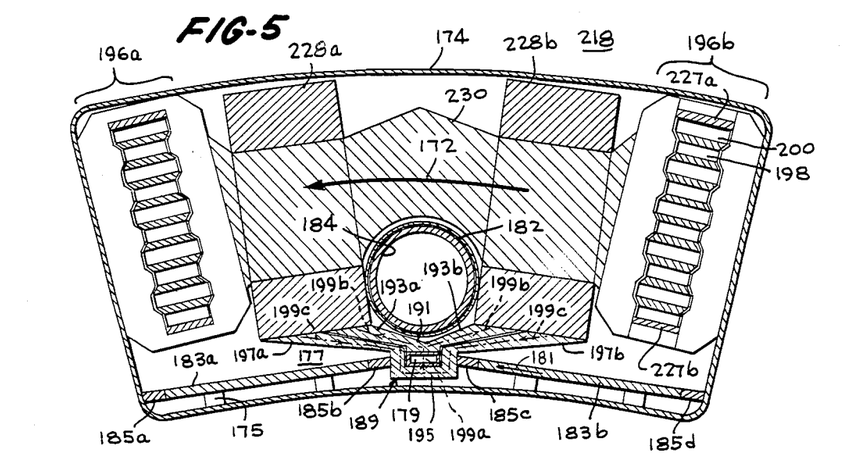
FIG. 5 is a plan, sectioned view taken from above an alternative embodiment of the flow coupler including an auxiliary magnetic field generator and a bootstrap generator duct for receiving a parallel portion of the flow of the intermediate liquid metal for generating a current flow for exciting a pair of field coils.

In FIG. 5, there is shown an alternative embodiment of the primary liquid metal in the form of a PSP 218 utilizing an auxiliary or bootstrap generator 177 to generate the excitation current for a pair of field coils 228a and 228b. As will become evident, the bootstrap generator 177 eliminates the need for electrical leads as are connected to the field coils 128a and 128b of the PSP 18, as shown in FIG. 4A. The general configuration and the elements of the PSP 218 are similar to those of the PSP 18 and are identified with similar numbers but in a higher hundred series. Briefly, the intermediate liquid metal is introduced to the PSP 218 via the downcomer pipe 184 and, thereafter, supplied to and directed upward and out of the page of FIG. 5 through the intermediate ducts 198. Further, the primary liquid metal is directed downward through the primary ducts 200. The field coils 228a and 228b are disposed about a pole piece 230 which directs the main magnetic field 172 across the air gaps associated with each of the ducts 200 and 198 of each of the duct modules 196a and 196b. The elements of the PSP 218 are housed within the outer shell 174. A plurality of the PSPs 218 is arranged in a circular array similar to that shown in FIG. 3 to supply, with pole pieces between adjacent PSPs 218, a continuous magnetic circuit for the main magnetic field 172.

In the embodiment of the PSP 218 as shown in FIG. 5, exciting current supplied to the field coils 228a and 228b is generated by the bootstrap generator 177. The generator 177 includes a bootstrap generator duct 179 extending vertically and in a substantially parallel relationship to each of the ducts 200 and 198. A first flow of the intermediate liquid metal is directed upward through the intermediate ducts 198 and a second flow of the intermediate liquid metal is directed in parallel with the first flow, upward through the bootstrap generator duct 179. An auxiliary magnetic field 181 is supplied across the intermediate liquid metal within the bootstrap generator duct 179 by a pair of permanent magnet sections 183a and 183b disposed on either side of the duct 179. A plurality of magnet pole pieces 185 serves to direct the auxiliary magnetic field 181 across the duct 179 and to direct the auxiliary magnetic field 181 to adjacent PSPs 218 to form the continuous, circular circuit for the auxiliary magnetic field 181, in a manner similar to that shown in FIG. 3. In particular, a pair of the magnetic pole pieces 185b and 185c are inserted respectively between the permanent magnet section 183a and the duct 179 and between the duct 179 and the permanent magnet section 193b. A plurality of spacers 175 serves to mount the permanent magnetic sections 183 upon the outer shell 174.

In a manner as explained above, the upward flow of the intermediate liquid metal within the bootstrap generator duct 179 interacts with the auxiliary magnetic field 181 directed perpendicular thereto, to generate a current flowing in a direction upward, as seen in FIG. 5, across the duct 179 and directed in parallel by a bootstrap generator buswork 189 to excite each of the field coils 228a and 228b. The bootstrap generator buswork 189 includes a lead-in conductor 191 having a pair of conductors, leg 193a directed to the magnetic coil 228a and leg 193b directed to the field coil 228b. The field coil energizing circuit is completed by a return conductor 195 having a conductor leg 197a interconnecting the field, coil 228a to the duct 179 and a conductor leg 197b connecting the field coil 228b to the duct 179.

Each of the field coils 228a and 228b is illustratively formed of a single turn of a highly conductive material such as copper having an input segment (not shown) abutting and electrically connected to the ends of its respective conductor legs 193, as well as an output segment disposed adjacent and electrically connected to the output ends of its respective conductor legs 197, whereby a complete circuit is formed for a second or auxiliary current flow along a path between the duct 179 and the field coils 228, whereby the field coils 228 are energized to generate the main magnetic field 172. The current path is indicated by a dotted line marked with a number 199 and flows from the top most surface of the duct 177 in bifurcated fashion through each of the conductor legs 193a and 193b, about the single turn of each of the field coils 228a and 228b, returning via the coil output segments along paths 199c within the conductor legs 197a and 197b to be redirected through the bottom wall of the duct 177, thus completing the energizing current circuit. The side walls of the bootstrap generator duct 179 are insulated by a pair of insulating layers (not shown for clarity) disposed between the side walls and the return conductor 195.

Figure 6:
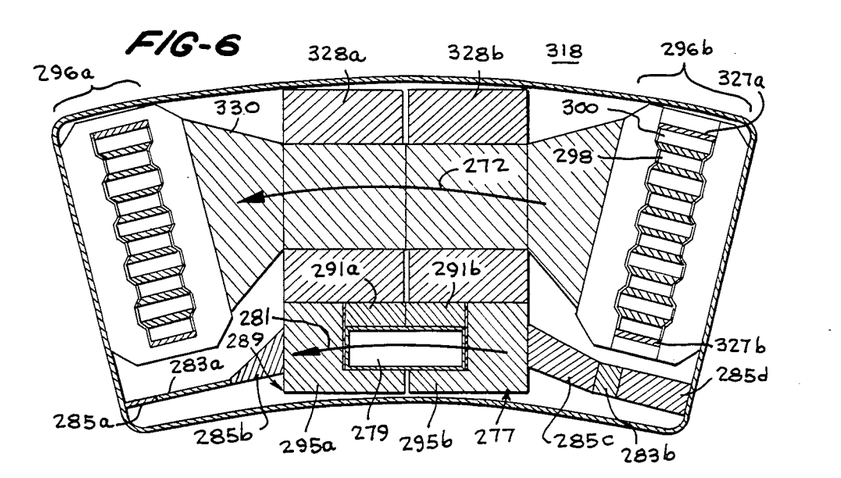
FIG. 6 is a plan, sectioned view of a still further embodiment of the flow coupler of this invention, including an auxiliary magnetic field generator and a bootstrap generator duct for receiving, in series, the entire flow of the intermediate liquid metal.

A further embodiment in the form of a PSP 318 is shown in FIG. 6, wherein an auxiliary or bootstrap generator 277 employs a series flow of the intermediate liquid metal to generate an exciting current for the main field coils 328a and 328b. The bootstrap generator 277 differs from generator 177, which employs a parallel flow of the intermediate liquid metal through the duct 179 and the intermediate ducts 198. By contrast, the PSP 318 of FIG. 6 directs the intermediate liquid metal downward into the page of FIG. 6 through a bootstrap generator duct 279 to a plenum (not shown), which directs the intermediate liquid to flow upward through the intermediate ducts 298 of each of the duct modules 296a and 296b. The intermediate liquid metal flows in series, first through the duct 279 and, then, through each of the intermediate ducts 298. It is understood that the bootstrap generator duct 279 also replaces the downcomer pipe 184 as used in the PSP 218 of FIG. 5. An auxiliary magnetic field 281 is generated by a pair of permanent magnet sections 283a and 283b, and is directed by magnetic pole pieces 285b and 285c to and from the duct 279, respectively. In an illustrative embodiment of this invention, the magnetic sections 283 are made of an Al-Ni-Co alloy. In a manner as explained above, the interaction between the auxiliary magnetic field 281 and the downward flow of the intermediate liquid metal through the bootstrap duct 279 generates a second current flow directed upward through the duct 279 and a bootstrap generator buswork 289 in parallel circuit to and from each of the field coils 328a and 328b. The buswork 289 includes a first pair of separate lead-in conductors 291a and 291b for supplying the current to input segments (not shown) of each of the field coils 328a and 328b, and a second pair of return conductors 295a and 295b for interconnecting output segments (not shown) of the field coils 328a and 328b to the lower wall of the duct 279, thus completing the parallel exciting circuits through the coils 328a and 328b. The series bootstrap generator 277 has been found to operate at a higher efficiency than either the parallel bootstrap generator 177 or the externally-excited field coils 128a and 128b. The total flow rate of the intermediate liquid metal through all of the intermediate ducts 298 and the flow rate through the bootstrap generator duct 279 are, of course, equal. The total pressure drop in the intermediate side of the PSP 318 is then the sum of the bootstrap generator and the intermediate duct pressure drops. A PSP 318 and its bootstrap generator 277 has been designed to deliver 150,000 A to each of its field coils 328a and 328b at an efficiency of 74%.

Since numerous modifications may be made in the above-described apparatus without departing from the spirit and scope of the invention, it is intended that the foregoing description be interpreted as illustrative, and not in a limiting sense. Though in the above specification the primary and intermediate flows have been described as being directed in opposite directions, it is contemplated that the flows of the primary and intermediate liquid metals may readily be directed in the same direction by suitable modifications to the duct and electrical buswork structures, within the scope of this invention.

We claim:

1. A liquid metal pump assembly adapted to be disposed as one of a plurality of said liquid metal pump assemblies in a continuous, circular array about a core of a nuclear reactor, said pump assembly having first and second ends and comprising:
   (a) a pipe for receiving and directing a pumped, intermediate liquid metal through said pump assembly in a first direction;
   (b) first and second duct modules disposed on either side of said pipe, each of said first and second duct modules comprising a primary duct for receiving and directing therethrough a primary liquid metal, and an intermediate duct in communication with said pipe for directing a first flow of said intermediate liquid metal therethrough in a second direction opposite to said first direction;
   (c) means for generating and directing a main magnetic field through each of said primary and intermediate ducts of said first and second duct modules and through said first and second ends of said pump assembly, whereby the interaction of said main magnetic field and said first flow of said intermediate liquid metal generates a first current flow, radially directed through said intermediate ducts and said primary ducts, and pumps said primary liquid metal through said pump ducts; and
   (d) at least one magnetic circuit element disposed adjacent one of said first and second duct modules and one of said first and second ends for directing said main magnetic field from said one duct module to an adjacent liquid metal pump assembly of said plurality, whereby said magnetic field as generated by each of said plurality of liquid metal pump assemblies is directed in a circular path along said continuous array.

2. The liquid metal pump assembly as claimed in claim 1, wherein said pipe is centrally disposed of said liquid metal pump assembly, and said first and second duct modules are disposed symmetrically about said pipe with respect to each other.

3. The liquid metal pump assembly as claimed in claim 2, wherein said generating means comprises a pole piece, and first and second field coils disposed about said pole piece.

4. The liquid metal pump assembly as claimed in claim 3, wherein said first and second field coils are disposed symmetrically on either side of said pipe with respect to each other.

5. The liquid metal pump assembly as claimed in claim 1, wherein there are 2N of said duct modules, wherein N is a whole number equal to or greater than one.

6. The liquid metal pump assembly as claimed in claim 1, wherein there is a first plenum disposed in communication with said pipe for receiving therefrom said pumped intermediate liquid metal and in communication with a first end of each of said intermediate ducts for directing therethrough said intermediate liquid metal, and a second plenum in communication with a second end of each of said intermediate ducts for receiving therefrom said intermediate liquid metal.

7. The liquid metal pump assembly as claimed in claim 6, wherein there is further included a heat exchanger disposed above said liquid metal pump assembly and comprising means for defining a first annularly-shaped cavity disposed about said pipe for receiving said primary liquid metal and a plurality of tubes disposed within said cavity, each of said tubes for receiving said primary liquid metal and having first and second ends, and a third plenum disposed between said heat exchanger and said liquid metal pump assembly and in communication with said second ends of said tubes for receiving therefrom said primary liquid metal and in communication with said primary ducts for introducing said primary liquid metal therethrough.

8. The liquid metal pump assembly as claimed in claim 1, wherein said magnetic field generating means comprises first and second field coils.

9. The liquid metal pump assembly as claimed in claim 8, wherein there is further included electrical lead means inserted through said liquid metal pump assembly for electrically actuating said first and second field coils.

10. The liquid metal pump assembly as claimed in claim 8, wherein said intermediate ducts receive a first flow of said intermediate liquid metal, and there is further included an auxiliary generator duct for receiving a second flow of said intermediate liquid metal, and auxiliary means for generating an auxiliary magnetic field through said auxiliary generator duct, whereby the interaction of said auxiliary magnetic field and said second flow of said intermediate liquid metal generates a second current flow applied to actuate said first and second field coils.

11. The liquid metal pump assembly as claimed in claim 10, wherein there is further included a buswork inserted between said auxiliary generator duct, and said first and second field coils for directing said second flow of current thereto.

12. The liquid metal pump assembly as claimed in claim 10, wherein there is included means in communication with said pipe for receiving therefrom said intermediate liquid metal and in communication with each of said auxiliary generator duct and said intermediate ducts for directing thereto in parallel said first and second flows of said intermediate liquid metal.

13. The liquid metal pump assembly as claimed in claim 8, wherein there is included means in communication with said pipe for receiving therefrom said intermediate liquid metal and in communication with said intermediate ducts for direction in series said intermediate liquid metal thereto.

14. The liquid metal pump assembly as claimed in claim 13, wherein there is further included auxiliary means generating and applying an auxiliary magnetic field to said pipe, whereby the interaction of said auxiliary magnetic field and said flow of said intermediate liquid metal generates a second current flow, and a buswork for coupling said second current flow through said auxiliary generator duct to each of said first and second field coils.

15. A nuclear reactor system comprising:
   (a) a nuclear core;

(b) a plurality of liquid metal pump assemblies disposed in a continuous, circular array about said core;

(c) each of said liquid metal pump assemblies having first and second ends and comprising:
   (1) a pipe for receiving and directing a pumped, intermediate liquid metal through its pump assembly in a first direction;
   (2) first and second duct modules disposed on either side of said pipe, each of said first and second duct modules comprising a primary duct for receiving and directing therethrough a primary liquid metal, and an intermediate duct in communication with said pipe for directing said intermediate liquid metal therethrough in a second direction opposite to said first direction;
   (3) means for generating and directing a main magnetic field through each of said primary and intermediate ducts of said first and second duct modules and through said first and second ends of each of said pump assemblies, whereby the interaction of said main magnetic field and a first flow of said intermediate liquid metal within said intermediate ducts generates a first, radially directed current flow through said intermediate ducts and said primary ducts, and pumps said primary liquid metal through said primary ducts; and (d) a plurality of magnetic circuits elements, at least one of said magnetic circuit elements disposed intermediate said first end and said second end of adjacent ones of said plurality of liquid metal pump assemblies, whereby said main magnetic field as generated by each of said plurality of said liquid metal pump assemblies is in a circular path along said continuous array.

16. The nuclear reactor system as claimed in claim 15, where in each of said plurality of pump assemblies, said pipe is centrally disposed of said liquid metal pump assembly, and said first and second duct modules are disposed symmetrically about said pipe with respect to each other.

17. The nuclear reactor system as claimed in claim 16, where in each of said plurality of pump assemblies, said generating means comprises a pole piece, and first and second field coils disposed symmetrically about said pole piece with respect to each other.

18. The nuclear reactor system as claimed in claim 15, where in each of said plurality of pump assemblies, there are 2N of said duct modules, wherein N is a whole number equal to or greater than one.

19. The nuclear reactor system as claimed in claim 15, wherein each of said plurality of pump assemblies further includes a first plenum disposed in communication with said pipe for receiving therefrom said pumped intermediate liquid metal and in communication with a first end of each of said intermediate ducts for directing therethrough said intermediate liquid metal, and a second plenum in communication with a second end of each of said intermediate ducts for receiving therefrom said intermediate liquid metal.

20. The nuclear reactor system as claimed in claim 19, wherein there is further included a heat exchanger disposed above each of said plurality of liquid metal pump assemblies and comprising means for defining a first annularly-shaped cavity disposed about said pipe for receiving said primary liquid metal and a plurality of tubes disposed within said cavity, each of said tubes for receiving said primary liquid metal and having first and second ends, and a third plenum disposed between each of said heat exchangers and said liquid metal pump assemblies and in communication with said second ends of said tubes for receiving therefrom said primary liquid metal and in communication with said primary ducts for introducing said primary liquid metal therethrough.

21. The nuclear reactor system as claimed in claim 15, wherein said generating means of each of said plurality of pump assemblies comprises first and second field coils.

22. The nuclear reactor system as claimed in claim 21, wherein there is further included electrical lead means inserted through each of said plurality of liquid metal pump assemblies for electrically actuating said first and second field coils.

23. The nuclear reactor system as claimed in claim 21, where in each of said plurality of pump assemblies, said intermediate ducts receive a first flow of said intermediate liquid metal, and there is further included an auxiliary generator duct for receiving a second flow of said intermediate liquid metal, and auxiliary means for generating an auxiliary magnetic field through said auxiliary generator duct, whereby the interaction of said auxiliary magnetic field and said second flow of said intermediate liquid metal generates a second current flow applied to actuate said first and second field coils.

24. The nuclear reactor system as claimed in claim 23, where in each of said plurality of pump assemblies, there is further included a buswork inserted between said auxiliary generator duct and said first and second field coils for directing said second flow of current thereto.

25. The nuclear reactor system as claimed in claim 23, where in each of said plurality of pump assemblies, there is included means in communication with said pipe for receiving therefrom said intermediate liquid metal and in communication with each of said auxiliary generator duct and said intermediate ducts for directing thereto in parallel said first and second flows of said intermediate liquid metal.

26. The nuclear reactor system as claimed in claim 21, where in each of said plurality of pump assemblies, there is included means in communication with said pipe for receiving therefrom said intermediate liquid metal and in communication with said intermediate ducts for directing in series said intermediate liquid metal thereto.

27. The nuclear reactor system as claimed in claim 26, where in each of said plurality of pump assemblies, there is further included auxiliary means for generating and applying an auxiliary magnetic field to said pipe, whereby the interaction of said auxiliary magnetic field and said flow of said intermediate liquid metal generates a second current flow, and a buswork for coupling said second current flow through said auxiliary generator duct to each of said first and second field coils.

* * * * *